(12) United States Patent
Buchner et al.

(10) Patent No.: US 12,169,138 B2
(45) Date of Patent: Dec. 17, 2024

(54) MEASURING SYSTEM FOR MEASURING FLOW INCLUDING TWO CORIOLIS FLOW METERS CONNECTED IN SERIES IN A MAIN CONDUIT

(71) Applicant: AVL LIST GMBH, Graz (AT)

(72) Inventors: Michael Buchner, Graz (AT); Heribert Kammerstetter, Salzburg (AT)

(73) Assignee: AVL LIST GMBH, Graz (AT)

( * ) Notice: Subject to any disclaimer, the term of this patent is extended or adjusted under 35 U.S.C. 154(b) by 313 days.

(21) Appl. No.: 17/439,409

(22) PCT Filed: Mar. 17, 2020

(86) PCT No.: PCT/AT2020/060096
§ 371 (c)(1),
(2) Date: Sep. 15, 2021

(87) PCT Pub. No.: WO2020/186279
PCT Pub. Date: Sep. 24, 2020

(65) Prior Publication Data
US 2022/0146293 A1     May 12, 2022

(30) Foreign Application Priority Data
Mar. 18, 2019   (AT) .................. 50226/2019

(51) Int. Cl.
*G01F 15/02*   (2006.01)
*G01F 1/84*   (2006.01)
*G01F 15/18*   (2006.01)

(52) U.S. Cl.
CPC .......... *G01F 1/8413* (2013.01); *G01F 15/024* (2013.01)

(58) Field of Classification Search
None
See application file for complete search history.

(56) References Cited

U.S. PATENT DOCUMENTS

| 4,341,107 A | 7/1982 | Blair et al. |
| 5,911,238 A | 6/1999 | Bump et al. |

(Continued)

FOREIGN PATENT DOCUMENTS

| AT | 521899 A1 | 6/2020 |
| CN | 1513110 A | 7/2004 |

(Continued)

*Primary Examiner* — Brandi N Hopkins
(74) *Attorney, Agent, or Firm* — Norman B. Thot

(57) ABSTRACT

A measuring system for measuring a mass flow rate, a density, a temperature and/or a flow rate. The measuring system includes a main conduit which leads from a supply unit to a consumer, a measuring unit, a computing unit, and an outlet pressure controller. The measuring unit has a first Coriolis meter arranged in the main conduit, a second Coriolis meter arranged in series with the first Coriolis meter in the main conduit, a bypass conduit via which the second Coriolis meter is bypassable, and a valve which opens depending on a pressure arranged in the bypass conduit. The second Coriolis meter has a smaller maximum flow rate than the first Coriolis meter. The computing unit is connected to each of the first Coriolis meter and the second Coriolis meter. The outlet pressure controller is arranged in the main conduit downstream of the measuring unit.

10 Claims, 2 Drawing Sheets

(56) References Cited

U.S. PATENT DOCUMENTS

| | | | |
|---|---|---|---|
| 6,360,579 B1* | 3/2002 | De Boom | G01F 25/13 |
| | | | 73/1.35 |
| 7,343,775 B2* | 3/2008 | Cunningham | G01F 25/13 |
| | | | 73/1.06 |
| 9,175,810 B2* | 11/2015 | Hains | G01F 25/10 |
| 9,475,687 B2* | 10/2016 | Deline | B67D 7/36 |
| 2004/0040387 A1* | 3/2004 | Nakao | G01F 1/8477 |
| | | | 73/861.354 |
| 2004/0216509 A1 | 11/2004 | Antonijevic | |
| 2009/0260361 A1* | 10/2009 | Prueitt | F01K 27/00 |
| | | | 60/670 |
| 2010/0139782 A1 | 6/2010 | Deline et al. | |
| 2011/0220213 A1* | 9/2011 | Cabrera | G01F 1/8413 |
| | | | 702/45 |
| 2012/0118077 A1* | 5/2012 | Henry | G01F 1/74 |
| | | | 73/861.354 |
| 2013/0186486 A1 | 7/2013 | Ding | |
| 2013/0291971 A1 | 11/2013 | Hains et al. | |
| 2013/0294890 A1* | 11/2013 | Cepeda-Rizo | F04D 29/58 |
| | | | 415/1 |
| 2014/0123742 A1 | 5/2014 | Matsuyama | |
| 2014/0190579 A1 | 7/2014 | Ding | |
| 2015/0160056 A1* | 6/2015 | Schollenberger | G01N 9/002 |
| | | | 73/861.357 |
| 2015/0219483 A1 | 8/2015 | Tauch et al. | |
| 2015/0276449 A1 | 10/2015 | Ito | |
| 2016/0281708 A1 | 9/2016 | Kammerstetter et al. | |
| 2018/0275697 A1* | 9/2018 | Lichtenegger | G01F 1/50 |
| 2018/0340815 A1* | 11/2018 | Hoover | G01F 25/10 |

FOREIGN PATENT DOCUMENTS

| | | |
|---|---|---|
| CN | 108027622 A | 5/2018 |
| CN | 108700445 A | 10/2018 |
| CN | 108731755 A | 11/2018 |
| DE | 597218 C | 5/1934 |
| EP | 0 834 723 A1 | 4/1998 |
| EP | 1 091 197 A2 | 4/2001 |
| EP | 2 660 570 A2 | 11/2013 |
| EP | 2 824 065 A1 | 1/2015 |
| EP | 3 105 647 B1 | 1/2019 |
| GB | 2 376 080 A | 12/2002 |
| JP | H02-504671 A | 12/1990 |
| JP | H04-99469 U | 8/1992 |
| JP | H04-313107 A | 11/1992 |
| JP | 2014-92459 A | 5/2014 |
| JP | 2015-148612 A | 8/2015 |
| JP | 2016-45694 A | 4/2016 |
| JP | 2016-180756 A | 10/2016 |
| JP | 2018-520436 A | 7/2018 |
| WO | WO 2016/059132 A1 | 4/2016 |
| WO | WO 2016/206983 A2 | 12/2016 |
| WO | WO 2017/137347 A1 | 8/2017 |

\* cited by examiner

MEASURING SYSTEM FOR MEASURING FLOW INCLUDING TWO CORIOLIS FLOW METERS CONNECTED IN SERIES IN A MAIN CONDUIT

CROSS REFERENCE TO PRIOR APPLICATIONS

This application is a U.S. National Phase application under 35 U.S.C. § 371 of International Application No. PCT/AT2020/060096, filed on Mar. 17, 2020 and which claims benefit to Austrian Patent Application No. A 50226/2019, filed on Mar. 18, 2019. The International Application was published in German on Sep. 24, 2020 as WO 2020/186279 A1 under PCT Article 21(2).

FIELD

The present invention relates to a measuring system for measuring a mass flow rate, a density, a temperature and/or a flow velocity, the measuring system comprising a main conduit that leads from a supply unit to a consumer, a measuring unit that consists of a first Coriolis meter arranged in the main conduit, a second Coriolis meter arranged in series with the first Coriolis meter in the main conduit and designed for a lower maximum flow rate than the first Coriolis meter, a bypass conduit via which the second Coriolis meter can be bypassed, and a valve that is arranged in the bypass conduit, and a computing unit that is connected to the first Coriolis meter and the second Coriolis meter.

BACKGROUND

Such measuring systems and associated measuring methods are utilized in a plurality of plants where information on flow rates, densities or velocities in the plant are required. Both the flow rates of liquids and of gases in the corresponding conduits can be measured via the meters used. An example regarding a flow rate is the use of such an assembly for consumption measurement of fuels in motor vehicles, which fuels can exist either in a gaseous or a liquid state.

Prior art consumption measuring systems use Coriolis meters since they offer a high accuracy in the case of single-phase flows and are also suitable for measuring flow velocities and flow rates of gaseous media. These Coriolis meters are meters that must build up a pressure in order to provide correct measuring results. These meters also only reach adequately accurate measuring result in one, and in one specific, flow range. Meters have therefore been described where a plurality of differently large Coriolis meters are combined with each other.

An example thereof is the system described in EP 2 660 570 A2 for supplying a gas turbine with a gaseous fuel. It is here proposed for consumption measurement to connect two flow rate meters in parallel and to connect a third flow rate meter in series. All three flow rate meters can be bypassed by a bypass conduit in which a switch valve is arranged. Two smaller flow rate meters are connected in parallel in front of a larger flow rate meter therefor, wherein the maximum flow rates of the small meters in total correspond to the maximum flow rate of the larger meter. A flow here always passes through all three flow rate meters, except for a case where one of the flow rate meters is removed for calibrating purposes. The result of the sum of the two small flow rate meters is compared to the measuring result of the large flow rate meter. As a result, in the case of a deviation being too large, either the measured values are weighted or merely one of the measured values is used.

When using such differently large flow rate meters connected in series or in parallel, the problem arises, however, that an adequate accuracy for different required pressures over a large flow measuring range cannot be continuously provided. In previously described configurations, a switchover of the switch valves causes pressure surges that affect the overall system and thus not only lead to measuring errors, but also possibly damage the connected meter subjected to measurement.

A51099/2018 describes a measuring system where, instead of the switch valve in the bypass conduit, a valve opening depending on the pressure, in particular a check valve, is used, via which the smaller Coriolis sensor is bypassed as of a specific pressure. Measuring errors can then merely be caused by the stored mass in the connecting conduit between the measuring unit and the consumer since, with rising flow rate, the measuring unit causes an increasing pressure loss via the sensors and in the downstream conduit so that the measuring unit is to be placed as close to the consumer as possible for attaining adequately accurate measuring results.

SUMMARY

An aspect of the present invention is to provide a measuring system and a measuring method for measuring a mass flow rate, a density, a temperature and/or a flow velocity via which it is possible to perform a highly accurate measurement even when the measuring unit is or must be arranged at a larger distance to the consumer, as is the case, for example, for climate cabinet tests, since the sensors are not specified for such ambient conditions for these tests. An aspect of the present invention is also to simulate real pressure conditions at the consumer.

In an embodiment, the present invention provides a measuring system for measuring at least one of a mass flow rate, a density, a temperature and a flow rate. The measuring system includes a main conduit which leads from a supply unit to a consumer, a measuring unit, a computing unit, and an outlet pressure controller. The measuring unit consists of a first Coriolis meter which is arranged in the main conduit, a second Coriolis meter which is arranged in series with the first Coriolis meter in the main conduit, a bypass conduit via which the second Coriolis meter is bypassable, and a valve which is arranged in the bypass conduit. The second Coriolis meter is designed for a smaller maximum flow rate than the first Coriolis meter. The valve is configured to open depending on a pressure. The computing unit is connected to each of the first Coriolis meter and the second Coriolis meter. The outlet pressure controller is arranged in the main conduit downstream of the measuring unit.

BRIEF DESCRIPTION OF THE DRAWINGS

The present invention is described in greater detail below on the basis of embodiments and of the drawings in which.

DETAILED DESCRIPTION

Figure 1:
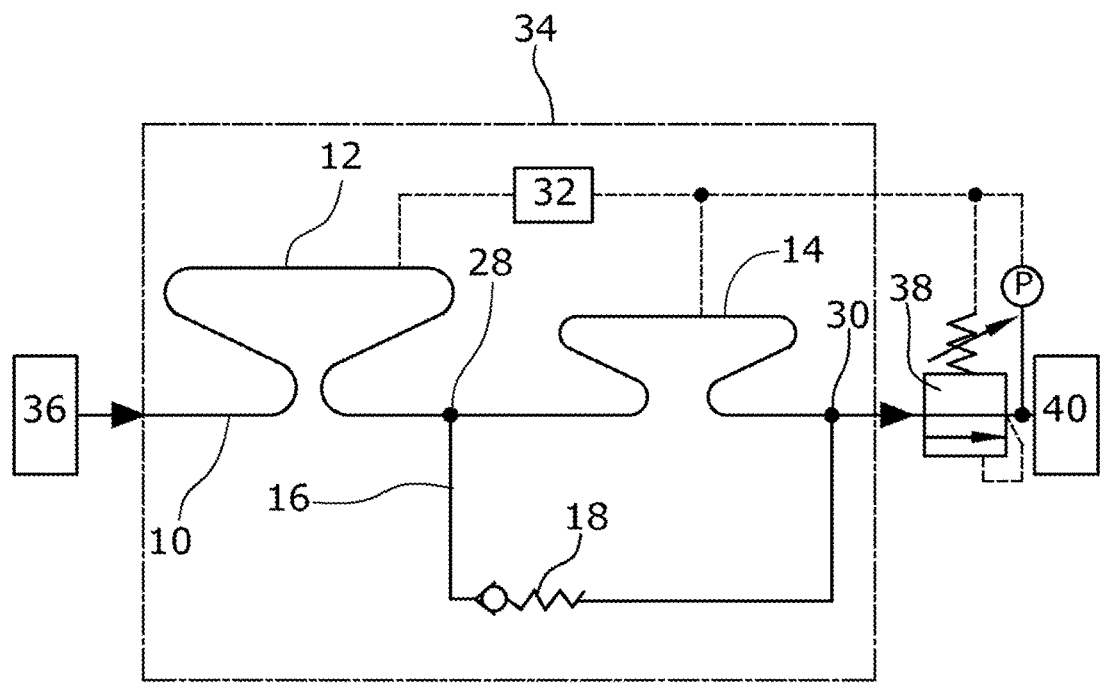
FIG. 1 shows a schematic representation of a first exemplary embodiment of a measuring system according to the present invention.

Since the valve opens depending on the pressure and an output pressure controller is arranged downstream of the measuring unit in the main conduit, the pressure downstream of the output pressure controller can be set to any value, in particular to a constant value. The following conduit leading to the consumer can accordingly have nearly any length without any mass consumption errors occurring. For achieving pressure stability it is, however, advisable to also keep the conduit between the output pressure controller and the consumer as short as possible. Merely the conduit between the measuring unit and the outlet pressure controller does not have a constant pressure, which leads to a non-constant mass in this conduit section in the case of compressible media. The length of this conduit section can, however, also easily be reduced to achieve very accurate measuring results. There is also the possibility to simulate conditions with changing pressures, as is the case in a vehicle when the tank gets empty which, for example, leads to a decreasing pressure. The pressure in the main conduit between the consumer and the measuring unit must of course be selected for this purpose so that it is larger than the pressure between the pressure controller and the supply device. Use of the valve opening depending on the pressure in the bypass conduit allows for a respective use of the measuring values of the Coriolis sensor that takes measurements in the corresponding measuring range with a higher accuracy. A valve opening depending on the pressure is here to be understood as a valve that starts to clear an opening cross-section when a threshold pressure is reached, wherein this opening cross-section increases with rising pressure. Pressure surges leading to an unsteadiness of the measured flow rate can thereby be avoided compared to a switch valve.

The outlet pressure controller can, for example, be arranged directly downstream of the measuring unit so that the length of the conduit between the measuring unit and the outlet pressure controller is minimized, and thus the measuring error caused by the non-constant mass in the conduit is also minimized.

In an embodiment, a second outlet pressure controller can, for example, be arranged in the main conduit upstream of the measuring unit. Due to such an arrangement, the supply pressure need not be constant for obtaining reliable measuring values since, as long as the supply pressure does not decrease to below the outlet pressure of the second outlet pressure controller, there are constant pressure conditions in front of the Coriolis meters and thus a return flow through the pressure controller can be prevented and, accordingly, the conduit between the supply device and the pressure controller can no longer contribute to an error in view of a non-constant pressure and thus a non-constant mass in the conduit.

It is additionally advantageous when the outlet pressure of the outlet pressure controller and/or the second outlet pressure controller is controllable since controlling to a desired pressure or to a varying inlet pressure at the consumer is thereby possible, whereby a tank getting empty, and thus leading to a decreasing pressure can, for example, be simulated.

In an alternative embodiment, a controllable compressor can, for example, be arranged in the main conduit upstream of the measuring unit. The compressor should be controllable in a highly dynamic manner for generating a steady constant pressure at its outlet, whereby, in this embodiment, the supply pressure also need no longer be constant. The pressure in the conduit behind the consumer additionally need no longer be larger than the pressure in front of the consumer since the compressor can increase the pressure to the desired pressure level.

In an embodiment, the compressor can, for example, be pulsation-free. Pressure fluctuations in the following conduits are thus avoided, without any buffer storages or pressure reducers for compensating for such pressure fluctuations having to be used.

An embodiment of the compressor as a Tesla compressor is here particularly advantageous since the Tesla compressor operates in a pulsation-free manner and does not require any additional lubrication.

In an embodiment of the present invention, a temperature conditioning unit can, for example, be arranged in the main conduit between the measuring unit and the outlet pressure controller, which temperature conditioning unit allows the temperature of the gas between the outlet of the measuring unit and the inlet of the consumer to be kept constant or to simulate temperature fluctuations for checking the influence on the consumer.

It is above all here advantageous when the temperature conditioning unit comprises a conditioning conduit in which a second compressor operating in a pulsation-free manner and a heat exchanger are arranged, and a return conduit which branches off the conditioning conduit downstream of the heat exchanger and the second compressor and which again enters the conditioning conduit upstream of the heat exchanger and the second compressor. This circulation of the measuring medium in the temperature conditioning unit allows a thermal shorting between the outlet of the measuring unit and the inlet of the outlet pressure controller to be provided, whereby the temperature can always be kept constant or controlled completely independent of the flow rate. The sensitive temperature unit can also be arranged at a distance to the outlet pressure controller, and the outlet pressure controller in the immediate vicinity of the consumer, for providing that the desired outlet pressure is provided at the consumer itself.

In an embodiment of the present invention, a respective pressure sensor is arranged in the main conduit between the measuring unit and the temperature conditioning unit as well as between the temperature conditioning unit and the outlet pressure controller, the pressure sensors being connected to a controlling unit of the second compressor operating in a pulsation-free manner, and the second compressor operating in a pulsation-free manner being controlled so that a constant pressure loss occurs between the pressure sensors in the main conduit. The pressure gradient of the temperature conditioning unit is thereby set to a desired constant value, whereby measuring errors due to pressure fluctuations caused by the temperature conditioning unit are reliably avoided.

A measuring system and a measuring method are accordingly provided via which flow rates occurring over a large flow range can be very accurately measured, even in the case of gases, since errors due to pressure fluctuations in the conduits and thus changing volumes in the conduits are avoided or minimized to a large extent. In the further embodiments, this can even be achieved at larger distances between the consumer and the supply unit, as is frequently the case for climate cabinet tests. Such a measuring system is additionally easy to adapt to the client's requirements in terms of the outlet pressure and the temperature and reaches considerably higher accuracies than previously described meters.

Four exemplary embodiments of measuring systems according to the present invention are illustrated in the drawings and their functionalities are described below based thereon.

The measuring system according to the present invention as illustrated in FIG. 1 is made up of a main conduit 10 through which a gaseous or liquid medium, for example, a gaseous fuel, passes whose mass flow rate is to be determined.

A first Coriolis meter 12 is arranged in the main conduit 10, the first Coriolis meter 12 having a maximum flow rate exceeding the expected maximum flow into the measuring system. The first Coriolis meter 12 does not provide exact measuring values at small flow rates due to a zero drift which occurs since Coriolis meters require a specific minimum flow rate for an exact measurement.

A second Coriolis meter 14 is arranged downstream of the first Coriolis meter 12 in the main conduit 10, the second Coriolis meter 14 having a maximum flow rate which is smaller than the maximum flow rate of the first Coriolis meter 12, but which, due to its measuring range, provides more exact measuring values at lower flow rates than the first Coriolis meter 12.

Since the upper range to be measured in the downstream second Coriolis meter 14 would, however, lie above its maximum flow rate and thus cause an extremely high pressure loss due to the produced orifice effect which would falsify the flow to be measured on the test piece or would render such flow impossible due to a minimum outlet pressure which is no longer adequate, a bypass conduit 16 branches off the main conduit 10 between the first Coriolis meter 12 and the second Coriolis meter 14. This bypass conduit 16 again enters the main conduit 10 downstream of the second Coriolis meter 14 in the present exemplary embodiment.

A valve 18 switching depending on the pressure is arranged in the bypass conduit 16, which valve 18 can be configured as a check valve or as a pressure controller.

The valve 18 switching depending on the pressure opens and closes a flow cross-section of the bypass conduit 16 depending on the pressure difference acting upon the valve 18. If a pressure difference which exceeds the threshold pressure difference exists, the flow cross-section is cleared and the medium can flow out of the main conduit 10 from a branch 28 of the bypass conduit 16, through the bypass conduit 16 and, via a mouth 30 of the bypass conduit 16, back into the main conduit 10.

The two Coriolis meters 12, 14 together with the valve 18 switching depending on the pressure and the bypass conduit 16 constitute a measuring unit 34 and are connected to a computing unit 32 to which the measuring values of the Coriolis meters 12, 14 are transmitted and in which these measuring values are processed for generating a usable measuring result.

If the medium travels into the main conduit 10 via a supply unit 36, it first flows through the first Coriolis meter 12 and a pressure is built up. The medium flows likewise through the second Coriolis meter 14 in which a pressure is also built up. The smaller second Coriolis meter 14 already reaches its measuring range at relatively small flow rates, in which measuring range it provides exact measuring values. An adequate flow rate for obtaining exact measurement values is not yet reached in the first Coriolis meter 12 having the higher maximum flow rate at this time. In this first measuring range, the computing unit 32 accordingly uses the measuring values of the second Coriolis meter 14 as an output value.

With an increasing flow rate in the measuring system, the accuracy of the first Coriolis meter 12 increases and the pressure drop across the second Coriolis meter 14 rises. A second measuring range is accordingly selected in which both the measuring values of the first Coriolis meter 12 and the measuring values of the second Coriolis meter 14 are taken into account and processed by the computing unit 32 by weighting and interpolating them depending on the pressure difference of the second Coriolis meter 14. The valve 18 closes the bypass conduit 16 both in the first and in the second measuring range.

These measuring values are also used as an output value by the computing unit 32 in the adjoining area where the flow rate is so high that precise measuring values are outputted by the first Coriolis meter 12.

This range is divided into two portions, namely, into a third measuring range in which the valve 18 opening depending on the pressure opens due to the existing pressure, and a fourth measuring range between the second measuring range and the third measuring range where the measuring values of the first Coriolis meter 12 are used as an output value but where the valve 18 opening depending on the pressure is not yet closed.

This means that a switching point of the valve 18 opening depending on the pressure is distant from the range in which the measuring values of the second smaller Coriolis meter 14 are used so that a falsification of the output values by a shift of the opening pressure of the valve 18 opening depending on the pressure can be prevented. Incorrect output values attributable to incorrect measuring results of the second Coriolis meter 14 due to a premature opening caused by an existing hysteresis or an aging-induced shift of the valve 18 opening depending on the pressure are thus reliably prevented.

An effect on the output values of the measuring system caused by switching the valve 18 opening depending on the pressure is thus prevented to a large extent in that the valve 18 continues to open with increasing pressure and thus gradually further clears the flow cross-section, while the resistance at the second Coriolis meter 14 grows. A pressure jump is thereby reliably prevented.

In the exemplary embodiment according to the present invention as per FIG. 1, in the main conduit 10 behind the measuring unit 34, i.e., downstream of the measuring unit 34 and in front of a consumer 40 whose fuel consumption is measured, an outlet pressure controller 38 is arranged in the main conduit 10, via which outlet pressure controller 38 the inlet pressure at the consumer 40 is kept constant. The length of the main conduit 10 between the outlet pressure controller 38 and the consumer 40 therefore no longer influences the measuring accuracy of the measuring system since volume changes of the fuel due to a changing pressure are prevented in this area. The main conduit 10 between the outlet pressure controller 38 and the consumer 40 can thus be selected in any length. The outlet pressure controller 38 is arranged in the immediate vicinity of the measuring unit 34 in order to minimize the influence of the conduit section between the outlet pressure controller 38 and the measuring unit 34. Under the condition that a constant supply pressure is provided by the supply unit 36, the fuel masses present in the main conduit thus no longer negatively affect the measuring results. An adjustable outlet pressure controller 38 can also set any pressure or generate a changing pressure in accordance with the saved characteristic lines, which is utilized here for simulating certain situations, such as a tank getting empty.

Figure 2:
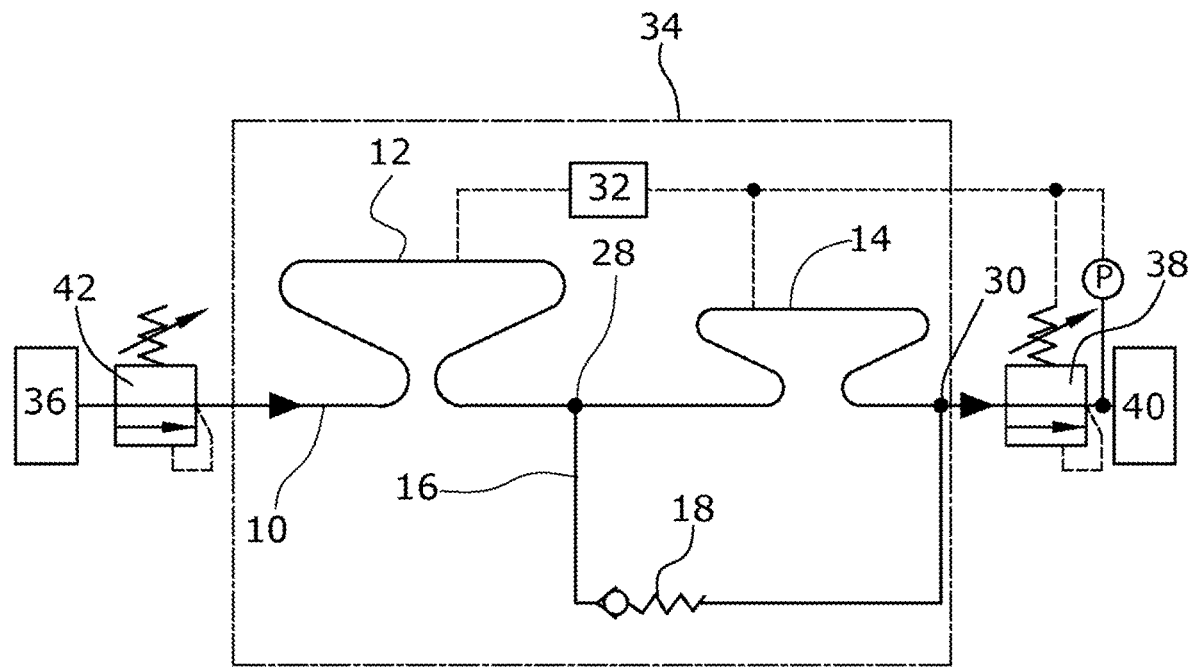
FIG. 2 shows a schematic representation of a second exemplary embodiment of a measuring system according to the present invention.

For attaining additional independence of a constant supply pressure of the supply unit 36, in the embodiment as per FIG. 2, a second outlet pressure controller 42 is additionally arranged in the main conduit 10 between the supply unit 36 and the measuring unit 34 so that the supply unit 36 can also be arranged at a distance to the measuring unit 34 and can provide a non-constant outlet pressure since measuring errors due to volume changes of the fuel in the main conduit 10 between the second outlet pressure controller 42 and the measuring unit 34 can be prevented and the conduit section of the main conduit 10 between the second outlet pressure controller 42 and the supply unit 36 no longer contribute to a measuring error since return flows through the second outlet pressure controller 42 are prevented. The outlet pressure of the second outlet pressure controller 42 is therefore set to be smaller than the normal supply pressure of the supply unit 36, whereby, even in the case of a decreasing pressure level of the supply unit 36, the outlet pressure at the second outlet pressure controller 42 and thus also in the measuring unit 34 can be maintained.

Figure 3:
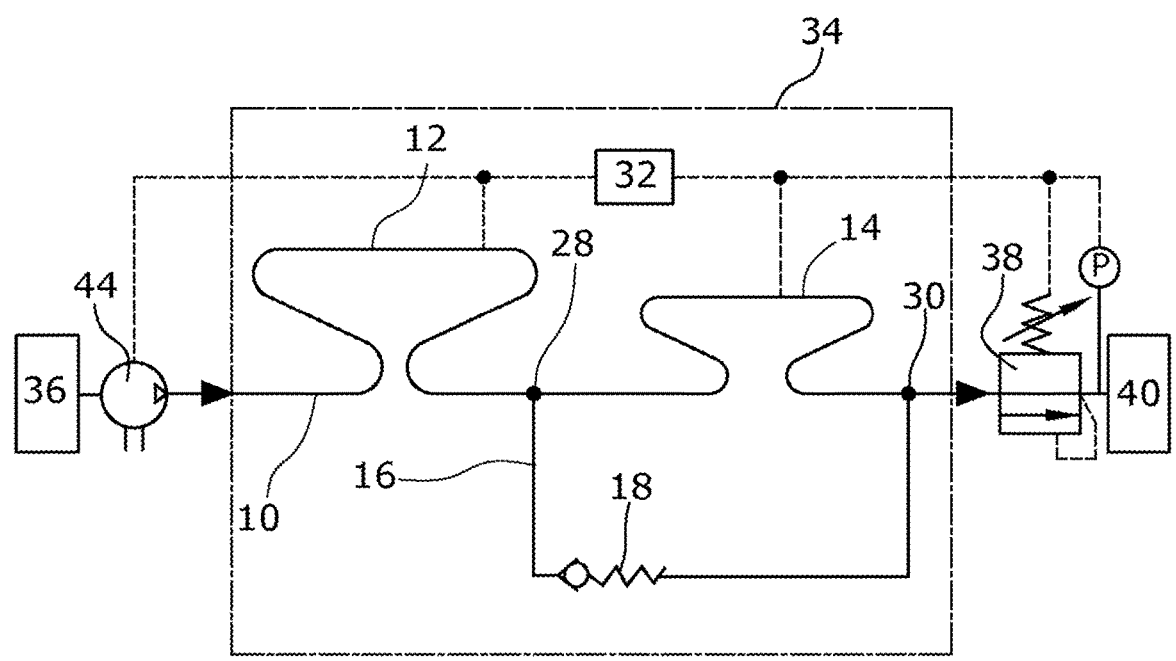
FIG. 3 shows a schematic representation of a third exemplary embodiment of a measuring system according to the present invention.

In the alternative embodiment illustrated in FIG. 3, the second outlet pressure controller 42 is replaced by a controllable compressor 44 which operates in a pulsation-free manner and which can, for example, be configured as a Tesla compressor. This compressor 44, like the second outlet pressure controller 42 in FIG. 2, provides that the conduit section upstream of the compressor 44 can no longer contribute to a measuring error since a return flow in this conduit section at a changing pressure can here also be prevented by the compressor 44, and the pressure provided by the supply unit 36 can additionally be lower since it need no longer be selected so that it is considerably larger than the inlet pressure at the consumer 40 because a constant outlet pressure can be provided by the compressor 44 operating in a pulsation-free manner.

Figure 4:
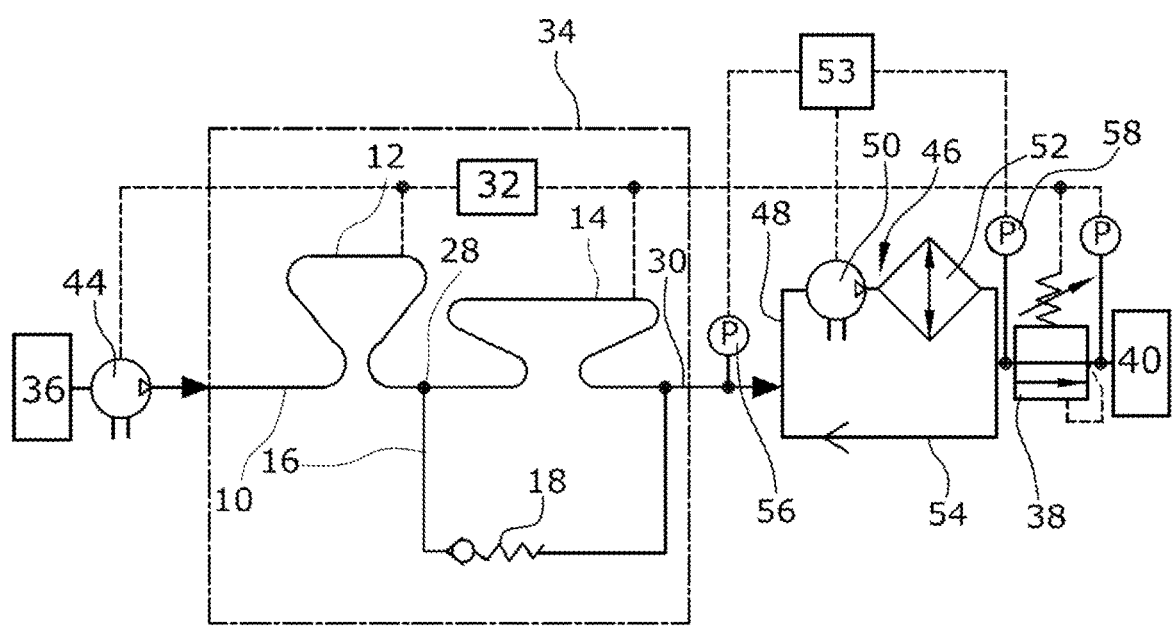
FIG. 4 shows a schematic representation of a fourth exemplary embodiment of a measuring system according to the present invention.

A further optimized solution is provided by the measuring system illustrated in FIG. 4. As compared to FIG. 3, a temperature conditioning unit 46 is here arranged in the main conduit 10 between the measuring unit 34 and the output pressure controller 38. The main conduit 10 accordingly enters a conditioning conduit 48 in which a second compressor 50, which operates in a pulsation-free manner and which can, for example, also be configured as a Tesla compressor, and a heat exchanger 52 for generating a desired temperature, are arranged. The temperature conditioning unit 46 also comprises a return conduit 54 via which the fuel branches off the conditioning conduit 48 downstream of the heat exchanger 52, and the second compressor 50 and enters the conditioning conduit 48 again upstream of the heat exchanger 52 and the second compressor 50.

This temperature conditioning unit 46 can easily be mounted downstream of the measuring unit 34 since it reliably sets the fuel supplied to the consumer 40 to a desired constant temperature even at smallest flow rates since the fuel is circulated by the second compressor 50 operating in a pulsation-free manner at a constant pressure drop in the conditioning circuit and at a constant temperature so that no temperature change occurs even at very small flows to the consumer 40. A constant pressure drop can be achieved by a corresponding control of the second compressor 50 by the second compressor 50 comprising a control unit 53 which is electrically connected to a first pressure sensor 56 arranged in the main conduit 10 directly upstream of the temperature conditioning unit 46, and a second pressure sensor 58 arranged in the main conduit 10 downstream of the temperature conditioning unit 46, and via which the second compressor 50 is controlled depending on a measured pressure difference between the first pressure sensor 56 and the second pressure sensor 58.

The described measuring systems provide very exact measuring values over a wide pressure and flow spectrum, which are continuously available. A settling of the system in the case of pressure changes is not required. This measuring system is in particular also suitable for measuring flow rates of gases and attains high measuring accuracies even at very small flow rates since potential volume changes of the fuel are limited to very small conduit sections and furthermore constant pressures are generated in the conduits, whereby, a changing volume caused by a changing pressure is prevented and return flows into other conduit sections are avoided.

Additional extensions are of course conceivable. More than two different Coriolis meters with reducing maximum flow rates can be connected in series, wherein, except for the largest Coriolis meter, a bypass is to be respectively provided. The measuring values of the Coriolis meter with the smallest maximum flow rate are in this case attained in the lowermost measuring range. Prior to opening the respective valve in the bypass conduit, the measuring values of the respective largest Coriolis meter are respectively used to determine the output value, wherein a respective interpolation range is interposed. The opening point of the valves then varies according to the pressure difference produced at the valve and occurring due to the pressure loss in the respective parallel-connected Coriolis meter. Different valves operating depending on the pressure and different pressure controllers can also be used. They can be driven in an electromotive or electromagnetic manner and controlled, for example, depending on values of the pressure sensors. A person skilled in the art will appreciate that further modifications within the scope of protection of the main claim are feasible. Reference should also be had to the appended claims.

LIST OF REFERENCE NUMERALS

10 Main conduit
12 First Coriolis meter
14 Second Coriolis meter
16 Bypass conduit
18 Valve (opening depending on pressure)
28 Branch
30 Mouth (of bypass conduit 16)
32 Computing unit
34 Measuring unit
36 Supply unit
38 Outlet pressure controller
40 Consumer
42 Second outlet pressure controller
44 Compressor
46 Temperature conditioning unit
48 Conditioning conduit
50 Second compressor
52 Heat exchanger
53 Control unit
54 Return conduit
56 First pressure sensor
58 Second pressure sensor

What is claimed is:

1. A measuring system for measuring at least one of a mass flow rate, a density, a temperature and a flow rate, the measuring system comprising:
 a main conduit which leads from a supply unit to a consumer;
 a measuring unit consisting of,
 a first Coriolis meter which is arranged in the main conduit,
 a second Coriolis meter which is arranged in series with the first Coriolis meter in the main conduit, the second Coriolis meter being designed for a smaller maximum flow rate than the first Coriolis meter,
 a bypass conduit via which the second Coriolis meter is bypassable, and
 a valve which is arranged in the bypass conduit, the valve being configured to open depending on a pressure;
 a computing unit which is connected to each of the first Coriolis meter and the second Coriolis meter; and
 a first outlet pressure controller which is arranged in the main conduit downstream of the measuring unit.

2. The measuring system as recited in claim 1, wherein the first outlet pressure controller is arranged directly downstream of the measuring unit.

3. The measuring system as recited in claim 1, further comprising:
 a second outlet pressure controller which is arranged in the main conduit upstream of the measuring unit.

4. The measuring system as recited in claim 3, wherein an outlet pressure of at least one of the first outlet pressure controller and of the second outlet pressure controller is configured to be controllable.

5. The measuring system as recited in claim 1, further comprising:
 a controllable compressor which is arranged in the main conduit upstream of the measuring unit.

6. The measuring system as recited in claim 5, wherein the controllable compressor is configured to be pulsation-free or is configured to operate in a pulsation-free manner.

7. The measuring system as recited in claim 6, wherein the controllable compressor is a Teslar compressor.

8. The measuring system as recited in claim 5, further comprising:
 a temperature conditioning unit which is arranged in the main conduit between the measuring unit and the first outlet pressure controller.

9. The measuring system as recited in claim 8, wherein the temperature conditioning unit comprises,
 a conditioning conduit in which is arranged a heat exchanger and a second compressor which is configured to operate in a pulsation-free manner, and
 a return conduit which branches off from the conditioning conduit downstream of the heat exchanger and the second compressor and which again enters the conditioning conduit upstream of the heat exchanger and the second compressor.

10. The measuring system as recited in claim 9, further comprising:
 a control unit which is configured to control the second compressor;
 a first pressure sensor which is configured to operate in a pulsation free manner, the first pressure sensor being arranged in the main conduit between the measuring unit and the temperature conditioning unit and being connected to the control unit; and
 a second pressure sensor which is configured to operate in a pulsation free manner, the second pressure sensor being arranged between the temperature conditioning unit and the first outlet pressure controller and being connected to the control unit;
 wherein,
 the control unit is configured to control the second compressor so that a constant pressure loss occurs between the first pressure sensor and the second pressure sensor in the main conduit.

* * * * *